(12) United States Patent
Ellis

(10) Patent No.: US 9,604,560 B1
(45) Date of Patent: Mar. 28, 2017

(54) ASSEMBLY FOR ADJUSTING A LUMBAR REGION OF A SEAT

(71) Applicant: Kongsberg Automotive, Inc., Novi, MI (US)

(72) Inventor: Peter Ellis, Livonia, MI (US)

(73) Assignee: KONGSBERG AUTOMOTIVE, INC., Novi, MI (US)

( * ) Notice: Subject to any disclaimer, the term of this patent is extended or adjusted under 35 U.S.C. 154(b) by 0 days.

(21) Appl. No.: 14/940,726

(22) Filed: Nov. 13, 2015

(51) Int. Cl.
*A47C 7/46* (2006.01)
*B60N 2/66* (2006.01)

(52) U.S. Cl.
CPC .................................. *B60N 2/6673* (2015.04)

(58) Field of Classification Search
CPC .................................. A47C 7/462; A47C 3/00
USPC ....................................................... 297/284.4
See application file for complete search history.

(56) References Cited

U.S. PATENT DOCUMENTS

| | | | |
|---|---|---|---|
| 3,890,000 A * | 6/1975 | Easley | B60N 2/66 297/284.4 |
| 4,159,847 A | 7/1979 | Arai | |
| 4,309,058 A | 1/1982 | Barley | |
| 4,565,406 A | 1/1986 | Suzuki | |
| 4,588,172 A | 5/1986 | Fourrey et al. | |
| 4,627,661 A | 12/1986 | Rönnhult et al. | |
| 4,697,848 A | 10/1987 | Hattori et al. | |
| 4,880,271 A | 11/1989 | Graves | |
| 4,886,316 A | 12/1989 | Suzuyama et al. | |
| 5,007,677 A | 4/1991 | Ozawa et al. | |
| 5,050,930 A | 9/1991 | Schuster et al. | |
| 5,092,654 A | 3/1992 | Inaba et al. | |
| 5,120,109 A | 6/1992 | Rangoni | |
| 5,197,780 A | 3/1993 | Coughlin | |
| 5,211,071 A | 5/1993 | Hedstrom | |

(Continued)

FOREIGN PATENT DOCUMENTS

| | | |
|---|---|---|
| CN | 201484242 U | 5/2010 |
| CN | 201525311 U | 7/2010 |

(Continued)

OTHER PUBLICATIONS

English language abstract for CN 201484242 extracted from espacenet.com on Jul. 18, 2016, 1 page.

(Continued)

*Primary Examiner* — Rodney B White
(74) *Attorney, Agent, or Firm* — Howard & Howard Attorneys PLLC

(57) ABSTRACT

An assembly for adjusting a lumbar region of a seat having a back frame. A seat support adapted for suspension in the frame is movable between first and second lumbar positions. An actuator is operatively attached to and concurrently moves with the support, and has a chassis mount and a drive mount selectively movable therewith between first and second positions. A wire extends between longitudinal ends adapted for attachment to the frame. A first guide slidably supported along the wire is coupled to the support and to the chassis mount. A second guide slidably supported along the wire is coupled to the support and to the drive mount. Movement of the drive mount from the first position urges the guides away from each other towards the ends of the wire such that the actuator and the seat support move toward the second lumbar position as a unit.

25 Claims, 8 Drawing Sheets

(56) References Cited

U.S. PATENT DOCUMENTS

| | | | |
|---|---|---|---|
| 5,217,278 A * | 6/1993 | Harrison | B60N 2/0296 |
| | | | 297/284.4 X |
| 5,449,219 A | 9/1995 | Hay et al. | |
| 5,474,358 A | 12/1995 | Maeyaert | |
| 5,507,559 A * | 4/1996 | Lance | B60N 2/6673 |
| | | | 297/284.4 |
| 5,641,205 A | 6/1997 | Schmidt | |
| 5,685,606 A * | 11/1997 | Lance | B60N 2/66 |
| | | | 297/284.4 X |
| 5,697,672 A | 12/1997 | Mitchell | |
| 5,716,098 A * | 2/1998 | Lance | B60N 2/667 |
| | | | 297/284.4 X |
| 5,769,490 A * | 6/1998 | Falzon | B60N 2/6673 |
| | | | 297/284.4 X |
| 5,788,328 A * | 8/1998 | Lance | A47C 7/465 |
| | | | 297/284.4 |
| 5,823,620 A | 10/1998 | Le Caz | |
| 5,913,569 A | 6/1999 | Klingler | |
| 6,053,064 A | 4/2000 | Gowing et al. | |
| 6,079,783 A | 6/2000 | Schuster, Sr. et al. | |
| 6,152,531 A | 11/2000 | Deceuninck | |
| 6,357,826 B1 * | 3/2002 | Gabas | B60N 2/66 |
| | | | 297/284.4 |
| 6,499,803 B2 * | 12/2002 | Nakane | B60N 2/66 |
| | | | 297/284.4 X |
| 6,557,938 B1 | 5/2003 | Long | |
| 7,000,986 B2 | 2/2006 | Cruz Fernandes de Pinho et al. | |
| 7,172,248 B2 | 2/2007 | McMillen et al. | |
| 7,494,183 B2 * | 2/2009 | Liu | B60N 2/443 |
| | | | 297/284.4 X |
| 7,690,726 B2 | 4/2010 | Samain | |
| 7,780,233 B2 | 8/2010 | McMillen | |
| 7,841,661 B2 | 11/2010 | Samain et al. | |
| 7,997,649 B2 | 8/2011 | Vanparys et al. | |
| 8,091,967 B2 | 1/2012 | Schweizer et al. | |
| 8,544,953 B2 | 10/2013 | Samain et al. | |
| 2005/0017555 A1 * | 1/2005 | Elliot | B60N 2/6671 |
| | | | 297/284.4 |
| 2008/0217978 A1 * | 9/2008 | Stossel | B60N 2/66 |
| | | | 297/284.4 |
| 2008/0265649 A1 | 10/2008 | McMillen et al. | |
| 2009/0115234 A1 | 5/2009 | Samain | |
| 2011/0115268 A1 * | 5/2011 | Maierhofer | A47C 7/465 |
| | | | 297/284.4 |
| 2014/0070583 A1 * | 3/2014 | McMillen | B60N 2/66 |
| | | | 297/284.4 |
| 2014/0070584 A1 * | 3/2014 | McMillen | B60N 2/0232 |
| | | | 297/284.4 |
| 2014/0125101 A1 * | 5/2014 | Hong | B60N 2/66 |
| | | | 297/284.4 |
| 2014/0125102 A1 * | 5/2014 | McMillen | B60N 2/66 |
| | | | 297/284.4 |
| 2014/0125103 A1 * | 5/2014 | Suzuki | B60N 2/66 |
| | | | 297/284.4 X |
| 2014/0346827 A1 * | 11/2014 | Suzuki | A47C 7/462 |
| | | | 297/284.7 |
| 2015/0305506 A1 * | 10/2015 | Suzuki | B60N 2/66 |
| | | | 297/284.4 |

FOREIGN PATENT DOCUMENTS

| | | |
|---|---|---|
| DE | 1914154 A1 | 6/1971 |
| DE | 3336349 A1 | 4/1985 |
| DE | 3341389 A1 | 5/1985 |
| DE | 3613763 A1 | 10/1986 |
| DE | 3633035 A1 | 4/1987 |
| DE | 3619188 C1 | 12/1987 |
| DE | 3620084 A1 | 12/1987 |
| DE | 3821018 A1 | 1/1989 |
| DE | 3939452 A1 | 5/1990 |
| DE | 4008936 A1 | 10/1990 |
| DE | 4405495 A1 | 8/1995 |
| DE | 19505447 A1 | 8/1996 |
| EP | 0 016 557 A1 | 10/1980 |
| EP | 0 046 892 A1 | 3/1982 |
| EP | 0 128 407 A1 | 12/1984 |
| EP | 0 158 562 A1 | 10/1985 |
| EP | 0 169 293 B1 | 10/1988 |
| EP | 0 296 938 B1 | 12/1988 |
| EP | 0 518 830 A1 | 12/1992 |
| EP | 0 301 938 B1 | 5/1993 |
| EP | 0 540 481 A1 | 5/1993 |
| EP | 0 458 000 B1 | 10/1993 |
| EP | 0 420 824 B1 | 1/1994 |
| EP | 0 485 483 B1 | 1/1994 |
| EP | 0 582 821 A1 | 2/1994 |
| EP | 0 517 644 B1 | 9/1995 |
| EP | 0 540 481 B1 | 12/1995 |
| EP | 0 563 709 B1 | 10/1996 |
| EP | 0 702 522 B1 | 3/1997 |
| EP | 0 598 071 B1 | 7/1997 |
| EP | 0 618 774 B1 | 7/1997 |
| EP | 0 803 400 A2 | 10/1997 |
| EP | 0 915 773 B1 | 5/2000 |
| EP | 0 759 715 B1 | 12/2000 |
| EP | 0 957 716 B1 | 12/2002 |
| EP | 1 733 649 A1 | 12/2006 |
| EP | 1 918 156 A1 | 5/2008 |
| FR | 2 447 168 A1 | 8/1980 |
| FR | 2 596 334 A1 | 10/1987 |
| GB | 1536132 A | 12/1978 |
| GB | 1545186 A | 5/1979 |
| GB | 2012569 A | 8/1979 |
| GB | 2285744 A | 7/1995 |
| GB | 2316604 A | 3/1998 |
| JP | 1-175808 A | 7/1989 |
| JP | 2-74429 A | 3/1990 |
| JP | 4-504075 A | 7/1992 |
| JP | 6-72217 A | 3/1994 |
| JP | 6-26524 B2 | 4/1994 |
| JP | 6-44460 U | 6/1994 |
| JP | 6-58757 U | 8/1994 |
| JP | 6-12448 U | 10/1994 |
| JP | 6-75250 U | 10/1994 |
| JP | 7-75608 A | 3/1995 |
| WO | 93/21800 A1 | 11/1993 |
| WO | 94/00039 A1 | 1/1994 |
| WO | 95/19123 A1 | 7/1995 |
| WO | 96/33640 A1 | 10/1996 |
| WO | 98/07590 A1 | 2/1998 |
| WO | 2016/094412 A1 | 6/2016 |

OTHER PUBLICATIONS

English language abstract for CN 201525311 extracted from espacenet.com on Jul. 20, 2016, 1 page.

* cited by examiner

ASSEMBLY FOR ADJUSTING A LUMBAR REGION OF A SEAT

BACKGROUND OF THE INVENTION

1. Field of the Invention

The present invention relates, generally, to vehicle seats and, more specifically, to an assembly for adjusting a lumbar region of a seat.

2. Description of the Related Art

Conventional seats known in the art include a base and a back configured to accommodate, support, and secure an occupant of a vehicle. The base is operatively attached to the vehicle, such as to a passenger compartment floorboard, and may be adapted to selectively move along the floorboard so as to effect selective legroom adjustment to accommodate differently-sized occupants. The back is pivotally attached to the base such that the occupant can selectively adjust the angular position of the back with respect to the base.

In addition to legroom adjustment and back/base angular position adjustment, seats known in the related art employ various mechanisms to facilitate adjustable support to the occupant at specific seat locations corresponding to anatomical regions of the body. By way of non-limiting example, the seat may include one or mechanisms to facilitate adjustment of lumbar support against the occupant's back, and/or bolster support against the occupant's hips, waist, or shoulders. Such selective adjustment is particularly advantageous when the occupant has been seated for an extended period of time.

There are a number of different types of mechanisms known in the related art for providing selectively adjustable support within a seat, including both manually-adjusted and power-adjusted mechanisms.

While seats and adjustment mechanisms known in the prior art have generally performed well for their intended purpose, there remains a need in the art for an adjustment mechanism assembly which strikes a substantial balance between packaging size, component cost, manufacturability, functionality, usability, and ergonomics.

SUMMARY OF THE INVENTION

The present invention overcomes the disadvantages in the related art in an assembly for adjusting a lumbar region of a seat having a back frame. The assembly includes a seat support adapted for suspension in the back frame of the seat. The seat support is movable between a first lumbar position and a second lumbar position. An actuator is operatively attached to the seat support and concurrently moves with the seat support between the lumbar positions. The actuator has a chassis mount and a drive mount selectively movable with respect to the chassis mount between first and second positions. A wire extends between longitudinal ends adapted for attachment to the back frame of the seat. A first guide is slidably supported along the wire and is coupled to the seat support and to the chassis mount of the actuator. A second guide is slidably supported along the wire and is coupled to the seat support and to the drive mount of the actuator. Movement of the drive mount of the actuator from the first position toward the second position urges the guides away from each other towards the ends of the wire such that the actuator and the seat support move from the first lumbar position toward the second lumbar position as a unit.

In this way, the shifter assembly of the present invention provides improved functionality and usability in connection with automatic transmission systems and, at the same time, reduces the cost and complexity of manufacturing and assembling shifter assemblies.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE INVENTION

Figure 1:
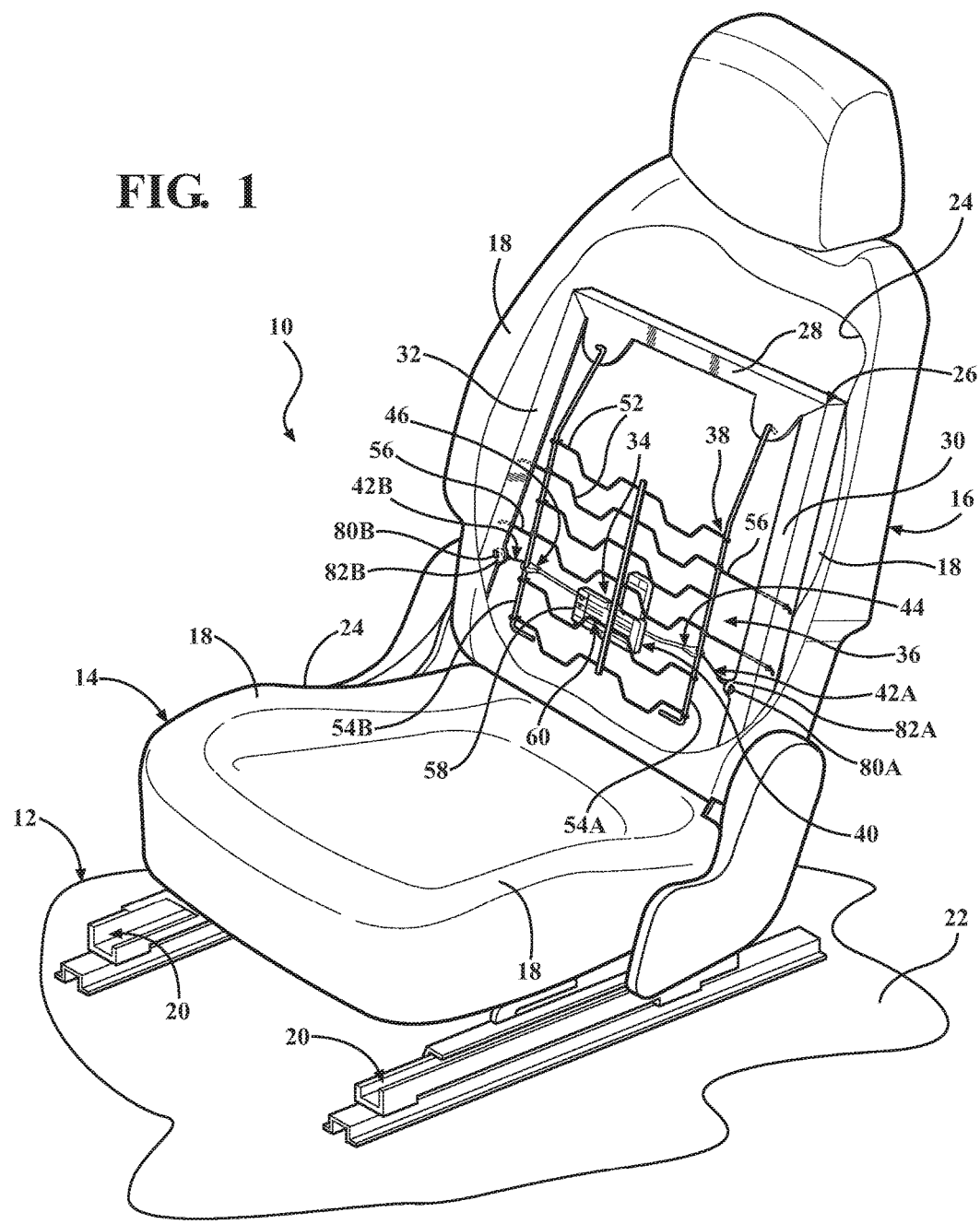
FIG. 1 is a perspective view of a vehicle seat having a back frame in which an assembly according to the present invention is suspended for adjusting a lumbar region of the seat.

With reference now to the Figures, wherein like numerals indicate like parts throughout the several views, a seat is shown at 10 in FIG. 1. The seat 10 is configured to be mounted in a passenger compartment of a vehicle, generally indicated at 12, and is used to accommodate, secure, and support an occupant of the vehicle 12. To that end, the seat 10 includes a base, generally indicated at 14, and a back, generally indicated at 16. The base 14 accommodates and provides support to the occupant's buttocks and thighs. Similarly, the back 16 accommodates and provides support to the occupant's shoulders, back, waist, and/or hips. The base 14 and/or the back 16 may include bolsters 18 configured to provide lateral support to the occupant so as to urge or otherwise hold the occupant in a seated position on the seat 10. For example, the bolsters 18 may be sized, shaped, and/or oriented so as to prevent the occupant from moving laterally relative to the base 14 and/or the back 16.

The back 16 is pivotally attached to the base 14 such that the occupant can selectively adjust the angular position of the back 16 with respect to the base 14 (not shown in detail, but generally known in the related art). In the representative embodiment illustrated herein, the base 14 is operatively attached to the vehicle 12 via one or more slider assemblies, generally indicated at 20 which, in turn, are secured to a floorboard 22 of the vehicle 12. The slider assemblies 20 are configured to facilitate selective movement of the seat 10 with respect to the vehicle 12 floorboard 22 so as to effect selective legroom adjustment to accommodate differently-size occupants. By way of non-limiting example, where the seat 10 is used to accommodate an operator of the vehicle 12, the slider assemblies 20 allow the operator to move the seat 10 closer-to or further-away-from the vehicle 12 controls, such as the accelerator, brakes, and/or steering wheel (not shown, but generally known in the art), and may be manually-adjusted or power-adjusted. However, those having ordinary skill in the art will appreciate that the seat 10 could accommodate any occupant of the vehicle 12 and, thus, could be positioned in any suitable location (i.e., driver seat, front passenger seat, rear seat, etc.) secured to any suitable portion of the vehicle 12 in any suitable way, with or without the use of slider assemblies 20, without departing from the scope of the present invention. Moreover, while the vehicle 12 described herein is an automobile, those having ordinary skill in the art will appreciate that the vehicle 12 could be of any suitable type without departing from the scope of the present invention. By way of non-limiting example, the vehicle 12 could be adapted for civilian, commercial, industrial, military, or law enforcement use on land, water, or in the air.

The base 14 and back 16 of the seat 10 each include frames that provide structural rigidity and support to the seat 10 and facilitate connection between various components of the seat 10 as well as connection to the vehicle 12, and may extend within the bolsters 18 so as to support foam and/or cushions supported in the base 14 and/or the back 16 (not shown in detail, but generally known in the related art) underneath one or more outer upholstery covers of the seat 10, generally indicated at 24. Typically, frames are formed of metal, but could be formed or otherwise manufactured from any suitable material sufficient to provide proper support for the occupant. The base 14 of the seat 10 includes a base frame (not shown) supported therein adapted to connect the base 14 to the slider assemblies 20, and the back 16 of the seat 10 includes a back frame 26 supported therein (see FIG. 1). The back frame 26 includes a top cross support 28 and a bottom cross support (not shown) spaced from and aligned substantially parallel to the top cross support 28. The back frame 26 further includes first and second side supports 30, 32 extending between the top cross support 28 and bottom cross support (not shown) to define a periphery of the back frame 26.

Referring now to FIGS. 1, 2, and 5-8, an assembly 34 according to the present invention is mounted within the back frame 26 of the back 16 for adjusting a lumbar region of the seat 10, generally indicated at 36. To that end, the assembly 34 includes a seat support 38, an actuator 40, a wire 42, and first and second guides 44, 46 which cooperate to facilitate selective adjustment of the lumbar region 36 of the seat 10. The seat support 38 is adapted for suspension in the back frame 26 of the seat 10 and is selectively movable between a first lumbar position 38A and a second lumbar position 38B. The actuator 40 is operatively attached to the seat support 38 and concurrently moves with the seat support 38 between the lumbar positions 38A, 38B. The actuator 40 has a chassis mount 48 and a drive mount 50 selectively movable with respect to the chassis mount 48 between first and second positions 50A, 50B. The wire 42 extends between first and second longitudinal ends 42A, 42B adapted for attachment to the back frame 26 of the seat 10. The first guide 44 is slidably supported along the wire 42 and is coupled to the seat support 38 and to the chassis mount 48 of the actuator 40. Similarly, the second guide 46 is slidably supported along the wire 42 and is coupled to the seat support 38 and to the drive mount 50 of the actuator 40. Movement of the drive mount 50 of the actuator 40 from the first position 50A toward the second position 50B urges the guides 44, 46 away from each other towards the ends 42A, 42B of the wire 42 such that the actuator 40 and the seat support 38 move from the first lumbar position 38A toward the second lumbar position 38B as a unit. The seat support 38, actuator 40, wire 42, and guides 44, 46 will be described in greater detail below.

As noted above, the seat support 38 is adapted for suspension in the back frame 26 of the seat 10. In the representative embodiment illustrated herein, the seat support 38 is mounted within the back frame 26 of the back 16 of the seat 10 and provides adjustable lumbar support to the occupant in the lumbar region 36. More specifically, as noted above, the seat support 38 and the actuator 40 move together between the lumbar positions 38A, 38B, adjacent to the lumbar region 36 of the seat 10, in response to movement of the drive mount 50 of the actuator 40 between the positions 50A, 50B.

Figure 2:
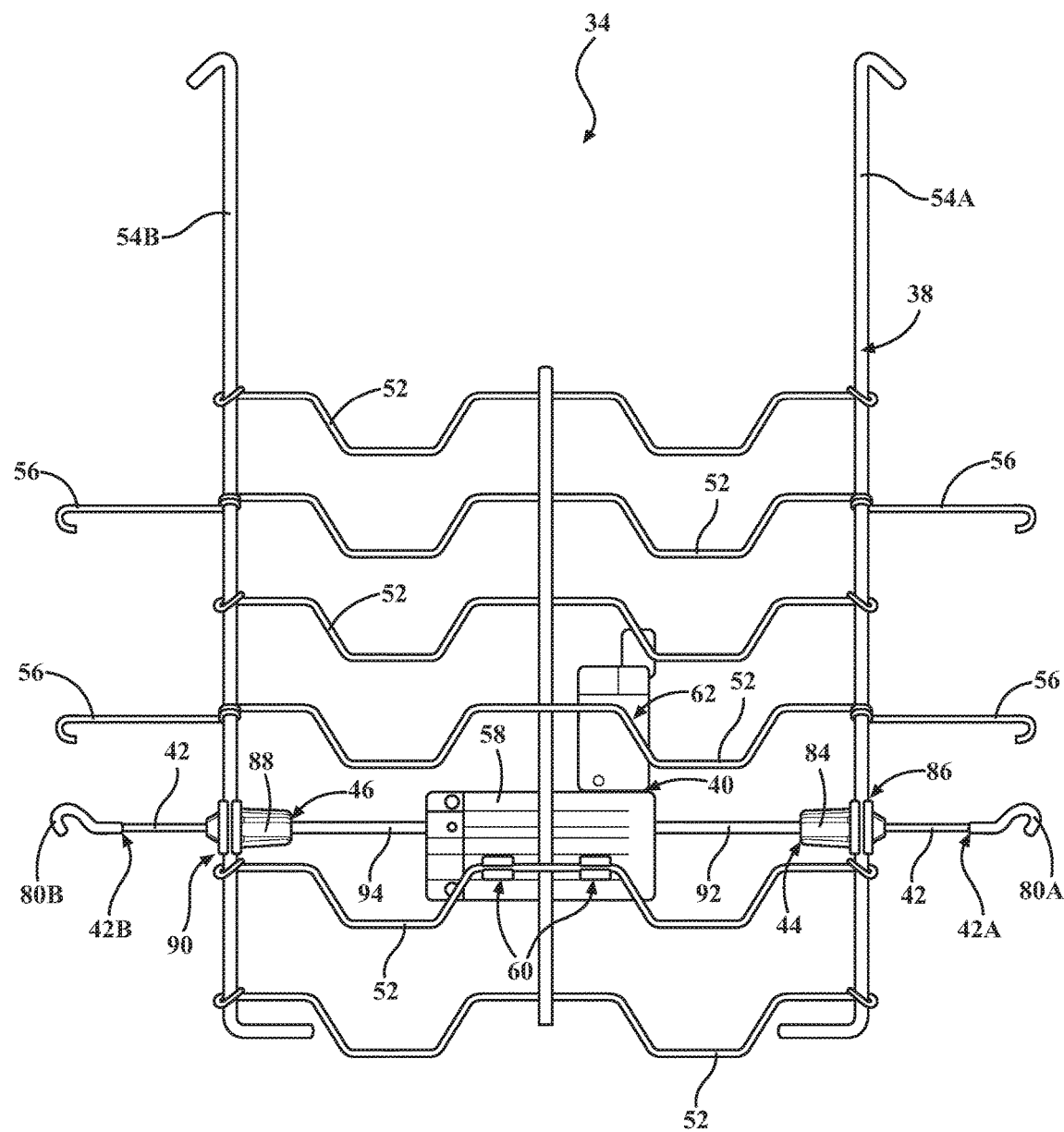
FIG. 2 is a plan view of the assembly of FIG. 1 showing a seat support, an actuator, a wire, and a pair of guides.
Figure 3:
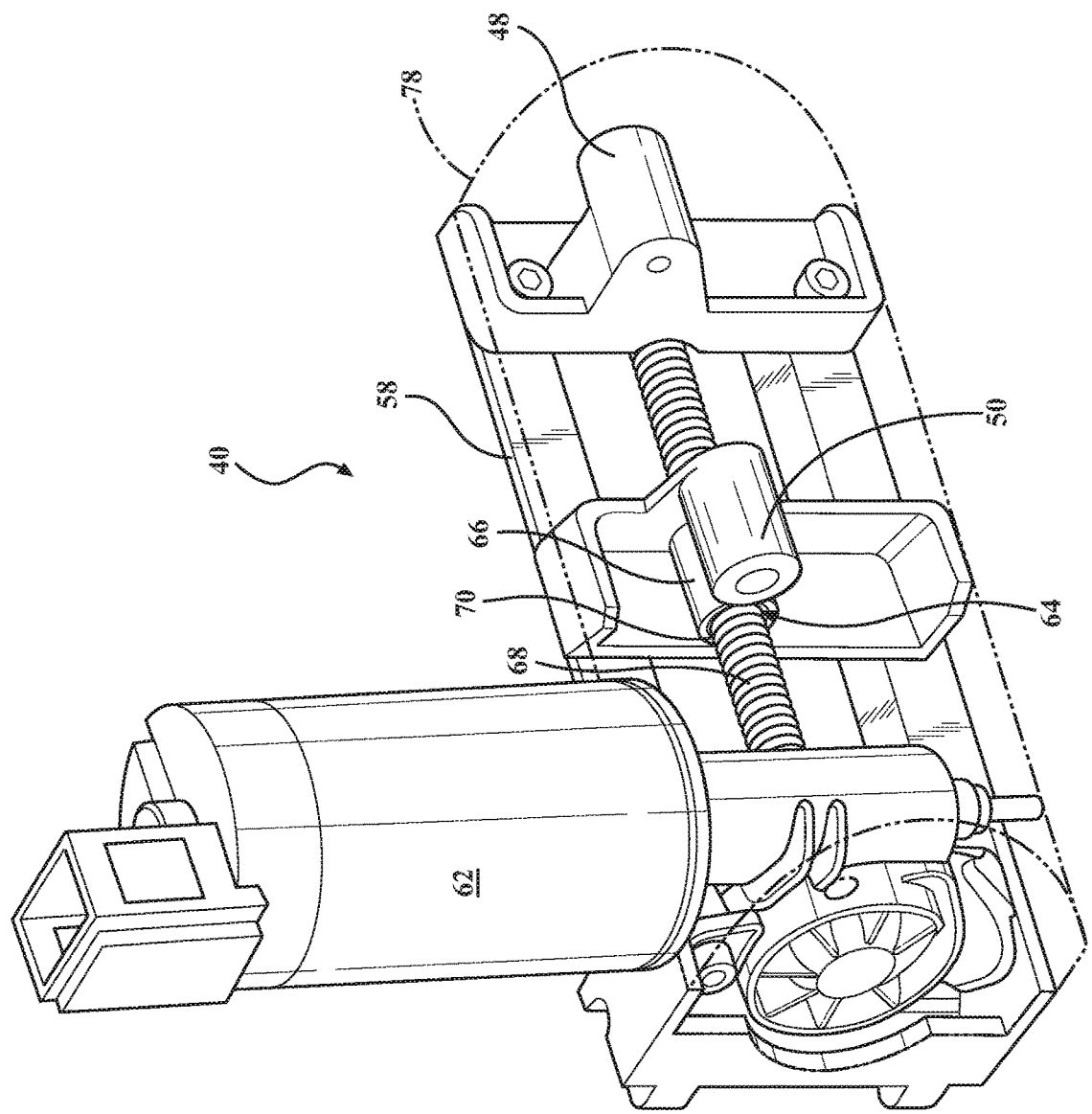
FIG. 3 is a perspective view of the actuator of FIG. 2 showing a drive mount and a chassis mount.
Figure 4:
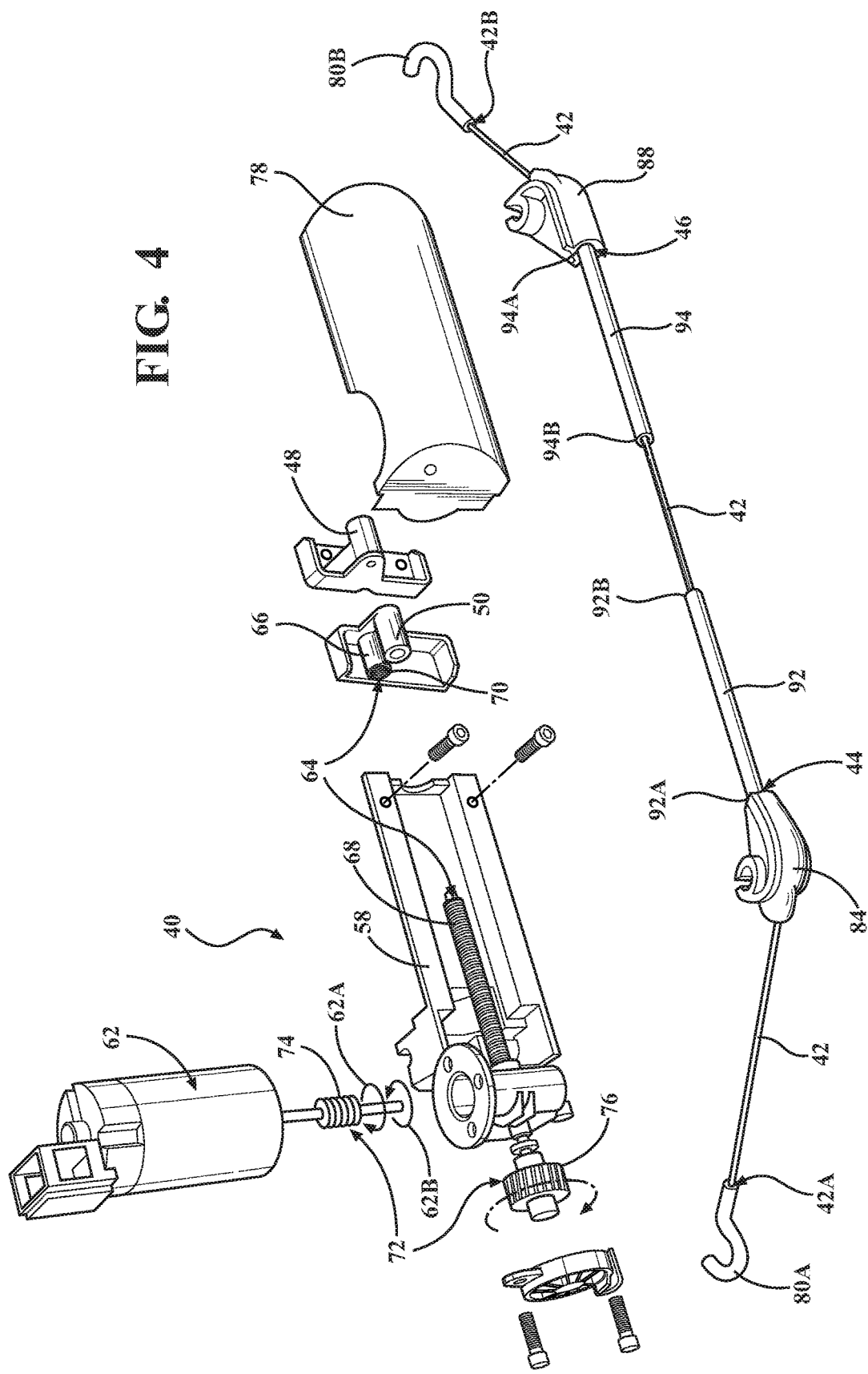
FIG. 4 is a partially-exploded perspective view of the actuator of FIGS. 2-3 and the wire and guides of FIG. 2.
Figure 5:
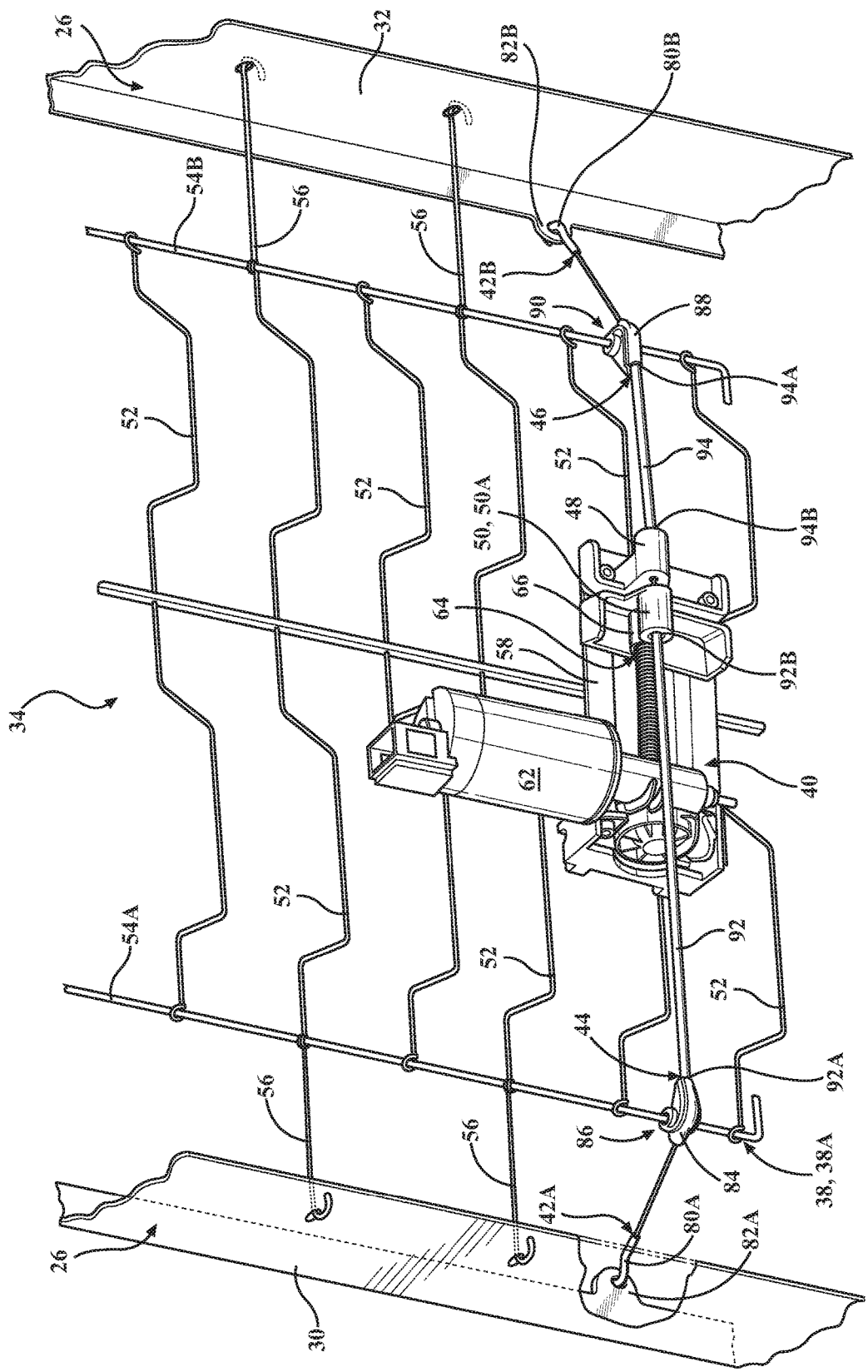
FIG. 5 is a partial perspective view of the back frame of FIG. 1 and the assembly of FIGS. 1-2 shown with the seat support in a first lumbar position.
Figure 6:
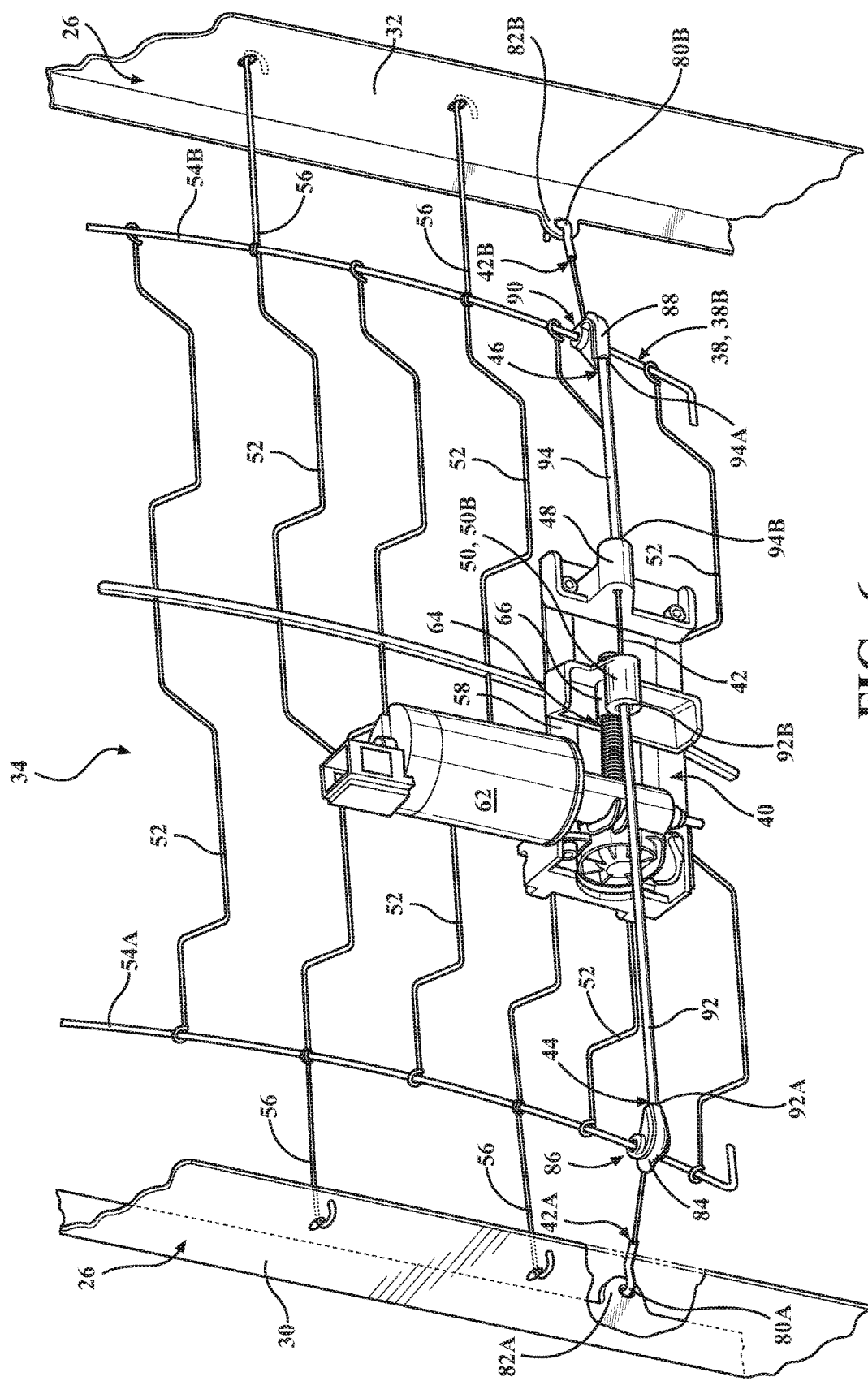
FIG. 6 is an alternate partial perspective view of the back frame of FIG. 1 and the assembly of FIGS. 1-2 shown with the seat support in a second lumbar position.

As shown best in FIGS. 1 and 2, the seat support 38 is a mat-type wire mesh configured to resiliently support the back 16 of the seat 10 so as to provide support to the vehicle 12 occupant. To that end, the seat support 38 includes a plurality of horizontal rods 52 and a plurality of vertical rods 54 supporting the horizontal rods 52. The seat support 38 also includes a plurality of rod hooks 56 formed with the horizontal rods 52 and extending from the vertical rods 54 to the side supports 30, 32 of the back frame 26 so as to suspend the seat support 38 therein. More specifically, the seat support 38 of the assembly 34 includes a first vertical rod 54A, a second vertical rod 54B spaced longitudinally from the first vertical rod 54A, and rod hooks 56. In one embodiment, the first guide 44 is coupled to the first vertical rod 54A, and the second guide 46 is coupled to the second vertical rod 54B. The rod hooks 56 extend from the first vertical rod 54A to the first side support 30 of the back frame 26, as well as from the second vertical rod 54B to the second side support 32 of the back frame 26. The rod hooks 56 extend at a constant length beyond the vertical rods 54A, 54B, thereby maintaining proper separation between the back frame 26 and the seat support 38 above the lumbar region 36 of the seat 10. As shown in FIG. 1, the rod hooks 56 attach to the back frame 26 within the back 16 and are spaced from the upholstery cover 24 so as to provide space for the foam or cushion between the seat support 38 and upholstery cover 24, as noted above.

As noted above, the actuator 40 of the assembly 34 is operatively attached to the seat support 38 for concurrent movement between the lumbar positions 38A, 38B. In one embodiment, the actuator 40 is operatively attached to at least one of the horizontal rods 52 for concurrent movement with the seat support 38 between the lumbar positions 38A, 38B. More specifically, the actuator 40 is slidably attached to the seat support 38 and travels at least partially longitudinally along the wire 42 in response to movement of the drive mount 50 between the positions 50A, 50B, as described in greater detail below. In one embodiment, the actuator 40 includes a chassis, generally indicated at 58, operatively attached to the seat support 38 and secured to the chassis mount 48 such that the chassis 58 and chassis mount 48 move together as a unit (compare FIG. 5 to FIG. 6). As shown in FIG. 2, in one embodiment, the chassis 58 of the actuator includes at least one securing feature, generally indicated at 60, for attaching the actuator 40 to the seat support 38, as discussed above. While the representative embodiment of the securing feature 60 illustrated in FIG. 2 is realized as a protrusion integrally formed with and extending from the chassis 58 that is clipped onto one of the horizontal rods 52 of the seat support 38, those having ordinary skill in the art will appreciate that the securing feature 60 could be formed, configured, oriented, or otherwise realized in any suitable way by any suitable structural feature or component sufficient to secure the actuator 40 to the seat support 38 as described above, without departing from the scope of the present invention.

Referring now to FIGS. 3-6, in one embodiment, the actuator 40 further includes a driver, generally indicated at 62, a screw drive 64, and a drive block 66. The driver 62 provides a source of rotational torque in opposing first and second rotational directions 62A, 62B. In one embodiment, the driver 62 is realized as an electric motor. The screw drive 64 is supported on the chassis 58 and is disposed in torque-translating relationship with the driver 62. The drive block 66 is supported in threaded engagement with the screw drive 64 and is fixed to the drive mount 50 such that rotation of the driver 62 in the first rotational direction 62A urges the drive block 66 and the drive mount 50 from the first position 50A toward the second position 50B, and rotation of the driver 62 in the second rotational direction 62B urges the drive block 66 and the drive mount 50 from the second position 50B toward the first position 50A.

The screw drive 64 includes an externally-threaded rod 68 extending along a portion of the chassis 58 which engages a corresponding internally-threaded portion 70 of the drive block 68 so as to linearly move the drive block 66 and the drive mount 50 between the positions 50A, 50B in response to rotation of the driver 62. It will be appreciated that the specific configuration of the threaded engagement of the screw drive 64 between the rod 68 and the portion 70, such as the pitch, thread count, etc., may be configured to correspond to force output of the actuator 40 necessary to facilitate movement between the lumbar positions 38A, 38B, based on available torque output of the driver 62 and structural characteristics of the seat support 38 and/or the back frame 26 of the seat 10

In one embodiment, the actuator 40 further includes a geartrain (also referred to herein as a "gear train"), generally indicated at 72, interposed in torque-translating relationship between the driver 62 and the screw drive 64. In the representative embodiment illustrated herein, the geartrain 72 includes a worm shaft 74 and a worm gear 76. The worm shaft 74 is coupled to the driver 62, and the worm gear 76 is coupled to the screw drive 64 (see FIG. 4). As shown in phantom in FIG. 3, the actuator 40 may also include a cover 78 encapsulating the mounts 48, 50, screw drive 64, and/or geartrain 72.

As noted above, the ends 42A, 42B of the wire 42 of the assembly 34 are adapted for attachment to the back frame 26 of the back 16 of the seat 10. To that end, as shown in the embodiment illustrated in FIGS. 1, 2, 4, and 5-8, the wire 42 may include a first hook 80A coupled to the first longitudinal end 42A, and a second hook 80B coupled to the second longitudinal end 42B. The hooks 80A, 80B are adapted for attachment to the back frame 26 of the back 16 of the seat 10. Specifically, as shown best in FIGS. 5 and 6, the side supports 30, 32 of the back frame 26 each include a mount 82A, 82B for the hooks 80A, 80B, respectively, and the first hook 80A attaches to the mount 82A of the first side support 30 of the back frame 26 and the second hook 80B attaches to the mount 82B of the second side support 32 of the back frame 26. However, those having ordinary skill in the art will appreciate that the wire 42 could be configured differently and could attach to the back frame 26 of the seat 10 in a number of different ways, with or without the use of hooks 80A, 80B, without departing from the scope of the present invention. Further, as will be appreciated from the subsequent description of the guides 44, 46 below, the wire 42 could be of any suitable type, manufactured from any suitable material, without departing from the scope of the present invention. By way of non-limiting example, the wire 42 could be realized as a solid wire, as a braided wire, or as a stranded wire.

The wire 42 of the assembly 34 is continuous between the longitudinal ends 42A, 42B and extends between the guides 44, 46, as noted above. The wire is disposed in tension and remains in tension as the guides 44, 46 move along the wire 42 when the seat support 38 and actuator 40 move between the lumbar positions 38A, 38B. More specifically, the wire 42 is operatively disconnected from the actuator 40 such that movement of the drive mount 50 and chassis mount 48 occurs along the wire 42 without altering a length of the wire 42 between the ends 42A, 42B.

In one embodiment, the first guide 44 includes a first guide mount 84 coupled to the seat support 38 at a first location 86, and the second guide 46 includes a second guide mount 88 coupled to the seat support 38 at a second location 90 spaced from the first location 86. More specifically, the first guide mount 84 is coupled to the first vertical rod 54A at the first location 86, and the second guide mount 88 is coupled to the second vertical rod 54B at the second location 90. In one embodiment, the first guide 44 further includes a first conduit 92 extending between the first guide mount 84 and the drive mount 50 of the actuator 40. The first conduit 92 has opposing first and second conduit ends 92A, 92B and is fixed to the first guide mount 84 at the first conduit end 92A and to the drive mount 50 of the actuator 40 at the second conduit end 92B. Similarly, in one embodiment, the second guide 46 further includes a second conduit 94 extending between the second guide mount 88 and the chassis mount 48 of the actuator 40. The second conduit 94 has opposing first and second conduit ends 94A, 94B and is fixed to the second guide mount 88 at the first conduit end 94A and to the chassis mount 48 of the actuator 40 at the second conduit end 94B. The conduits 92, 94 are spaced from each other along the wire 42 when the drive mount 50 of the actuator 40 is in both of the positions 50A, 50B, as described above. Thus, it will be appreciated that the wire 42 passes through the first guide mount 84, the first conduit 92, the drive mount 50, the chassis mount 48, the second conduit 94, and the second guide mount 88.

Figure 7:
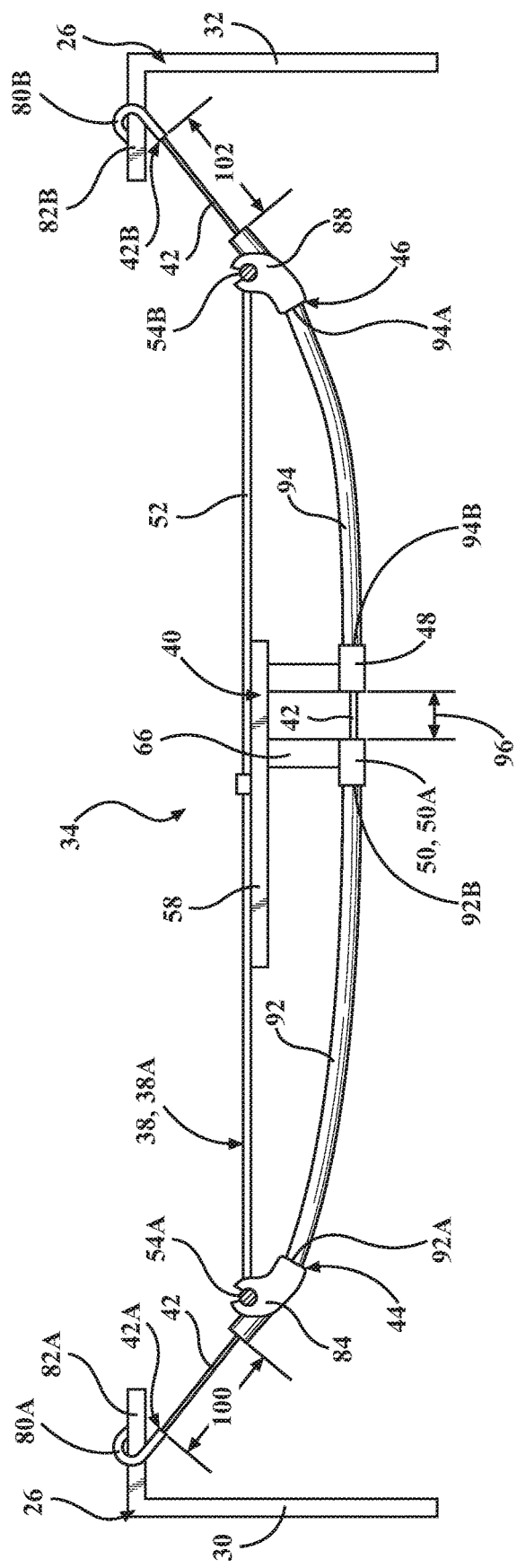
FIG. 7 is a partial schematic top-side view of the back frame and a portion of the assembly of FIG. 5 shown with the seat support in the first lumbar position.
Figure 8:
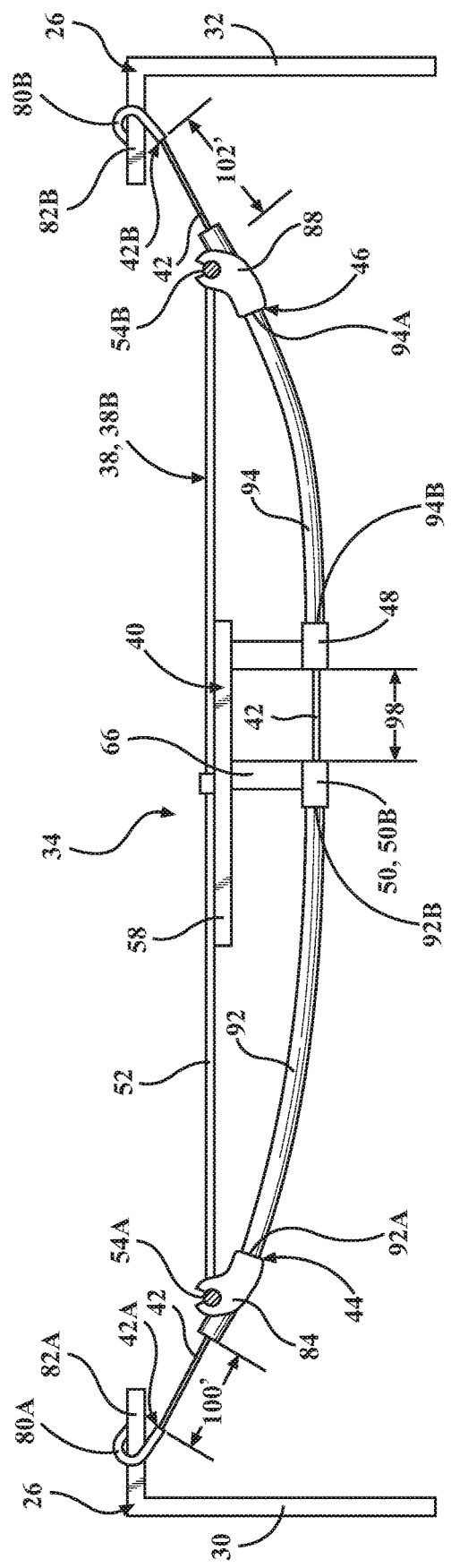
FIG. 8 is a partial schematic top-side view of the back frame and a portion of the assembly of FIG. 6 shown with the seat support in the second lumbar position.

Referring now to FIGS. 7 and 8, in one embodiment, the chassis mount 48 is spaced from the drive mount 50 by a first distance 96 when in the first position 50A (see FIG. 7), and the chassis mount 48 is spaced from the drive mount 50 by a second distance 98 when in the second position 50B (see FIG. 8) with the second distance 98 being greater than the first distance 96. Similarly, in one embodiment, the wire 42 has a first wire length 100, 100' defined between the first longitudinal end 42A of the wire 42 and the first guide 44 (compare FIGS. 7 and 8), and a second wire length 102, 102' defined between the second longitudinal end 42B of the wire 42 and the second guide 46 (compare FIGS. 7 and 8). The first wire length 100, 100' and the second wire length 102, 102' define a first sum wire length when the drive mount 50 is in the first position 50A (see FIG. 7). The first wire length 100, 100' and the second wire length 102, 102' define a second sum wire length when the drive mount 50 is in the second position 50B (see FIG. 8). A difference between the second sum wire length and the first sum wire length is equal to a difference between the second distance 98 and the first distance 96.

In this way, the assembly 34 of the present invention provides for selective adjustment of the lumbar region 36 of the seat 10 while affording significantly optimized and space-efficient component packaging and, at the same time, reduces the cost and complexity of manufacturing and assembling lumbar adjustment mechanisms for seats 10.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

The invention claimed is:

1. An assembly for adjusting a lumbar region of a seat having a back frame, said assembly comprising:
   a seat support adapted for suspension in the back frame of the seat, with said seat support movable between a first lumbar position and a second lumbar position;
   an actuator operatively attached to said seat support to concurrently move with said seat support between said lumbar positions, said actuator having a chassis mount and a drive mount selectively movable with respect to said chassis mount between first and second positions;
   a wire extending between first and second longitudinal ends with said ends adapted for attachment to the back frame of the seat;
   a first guide slidably supported along said wire and coupled to said seat support and to said chassis mount of said actuator; and
   a second guide slidably supported along said wire and coupled to said seat support and to said drive mount of said actuator;
   wherein movement of said drive mount of said actuator from said first position toward said second position urges said guides away from each other towards said ends of said wire such that said actuator and said seat support move from said first lumbar position toward said second lumbar position as a unit; and
   wherein said chassis mount is spaced from said drive mount by a first distance when in said first position, and said chassis mount is spaced from said drive mount by a second distance when in said second position with said second distance being greater than said first distance.

2. The assembly as set forth in claim 1, wherein said wire is continuous between said ends through said guides.

3. The assembly as set forth in claim 1, wherein said wire is disposed in tension through said guides and remains in tension as said guides move along said wire when said seat support moves between said lumbar positions.

4. The assembly as set forth in claim 1, wherein said wire is operatively disconnected from said actuator such that movement of said drive mount and said chassis mount is along said wire without altering a length of said wire between said ends.

5. The assembly as set forth in claim 1, wherein said first guide includes a first guide mount coupled to said seat support at a first location; and wherein said second guide includes a second guide mount coupled to said seat support at a second location spaced from said first location.

6. The assembly as set forth in claim 5, wherein said first guide further includes a first conduit extending between said first guide mount and said drive mount of said actuator.

7. The assembly as set forth in claim 6, wherein said first conduit has opposing first and second conduit ends with said first conduit fixed to said first guide mount at said first conduit end and to said drive mount of said actuator at said second conduit end.

8. The assembly as set forth in claim 6, wherein said second guide further includes a second conduit extending between said second guide mount and said chassis mount of said actuator.

9. The assembly as set forth in claim 8 wherein said second conduit has opposing first and second conduit ends with said first conduit fixed to said second guide mount at said first conduit end and to said chassis mount of said actuator at said second conduit end.

10. The assembly as set forth in claim 8, wherein said conduits are spaced from each other along said wire when said drive mount of said actuator is in both of said positions.

11. The assembly as set forth in claim 1, wherein said wire has a first wire length defined between said first longitudinal end of said wire and said first guide, and a second wire length is defined between said second longitudinal end of said wire and said second guide, with said first wire length and said second wire length defining a first sum wire length of when said drive mount is in said first position, and said first wire length and said second wire length defining a second sum wire length when said drive mount is in said second position; and a difference between said second sum wire length and said first sum wire length being equal to a difference between said second distance and said first distance.

12. The assembly as set forth in claim 1, wherein said actuator is slidably attached to said seat support and travels at least partially longitudinally along said wire in response to movement of said drive mount of said actuator between said first and second positions.

13. The assembly as set forth in claim 1, wherein said seat support includes a first vertical rod and a second vertical rod spaced longitudinally from said first vertical rod.

14. The assembly as set forth in claim 13, wherein said first guide is coupled to said first vertical rod and said second guide is coupled to said second vertical rod.

15. The assembly as set forth in claim 1, wherein said actuator includes a chassis operatively attached to said seat support and secured to said chassis mount such that said chassis and said chassis mount move as a unit.

16. The assembly as set forth in claim 15, wherein said chassis includes at least one securing feature for attaching said actuator to said seat support.

17. The assembly as set forth in claim 15, wherein said actuator further includes a driver for providing a source of rotational torque in opposing first and second rotational directions, a screw drive supported on said chassis and disposed in torque translating relationship with said driver, and a drive block supported in threaded engagement with said screw drive and fixed to said drive mount such that rotation of said driver in said first rotational direction urges said drive block and said drive mount from said first position toward said second position and rotation of said driver in said second rotational direction urges said drive block and said drive mount from said second position toward said first position.

18. The assembly as set forth in claim 17, wherein said actuator includes a gear train interposed in torque translating relationship between said driver and said screw drive.

19. The assembly as set forth in claim 1, wherein said wire further includes a first hook coupled to said first longitudinal end of said wire and a second hook coupled to said second longitudinal end of said wire, with said hooks adapted for attachment to the back frame of the seat.

20. An assembly for adjusting a lumbar region of a seat having a back frame, said assembly comprising:

a seat support adapted for suspension in the back frame of the seat, with said seat support movable between a first lumbar position and a second lumbar position;

an actuator operatively attached to said seat support to concurrently move with said seat support between said lumbar positions, said actuator having a chassis mount and a drive mount selectively movable with respect to said chassis mount between first and second positions;

a first guide coupled to said seat support and to said chassis mount of said actuator;

a second guide coupled to said seat support and to said drive mount of said actuator; and a wire extending between first and second longitudinal ends with said ends adapted for attachment to the back frame of the seat, and with said first guide and said second guide each being slidably supported to move along said wire between said first longitudinal end and said second longitudinal end;

wherein movement of said drive mount of said actuator from said first position toward said second position urges said guides away from each other towards said ends of said wire such that said actuator and said seat support move from said first lumbar position toward said second lumbar position as a unit.

21. The assembly as set forth in claim 20, wherein said wire is continuous between said ends through said guides.

22. The assembly as set forth in claim 20, wherein said wire is disposed in tension through said guides and remains in tension as said guides move along said wire when said seat support moves between said lumbar positions.

23. The assembly as set forth in claim 20, wherein said wire is operatively disconnected from said actuator such that movement of said drive mount and said chassis mount is along said wire without altering a length of said wire between said ends.

24. The assembly as set forth in claim 20, wherein said chassis mount is spaced from said drive mount by a first distance when in said first position, and said chassis mount is spaced from said drive mount by a second distance when in said second position with said second distance being greater than said first distance.

25. The assembly as set forth in claim 24, wherein said wire has a first wire length defined between said first longitudinal end of said wire and said first guide, and a second wire length is defined between said second longitudinal end of said wire and said second guide, with said first wire length and said second wire length defining a first sum wire length of when said drive mount is in said first position, and said first wire length and said second wire length defining a second sum wire length when said drive mount is in said second position; and a difference between said second sum wire length and said first sum wire length being equal to a difference between said second distance and said first distance.

* * * * *